United States Patent [19]
Guerra

[11] Patent Number: 5,754,514
[45] Date of Patent: May 19, 1998

[54] PHASE CONTROLLED EVANESCENT FIELD SYSTEMS AND METHODS FOR OPTICAL RECORDING AND RETRIEVAL

[75] Inventor: John M. Guerra, Concord, Mass.

[73] Assignee: Polaroid Corporation, Cambridge, Mass.

[21] Appl. No.: 728,262

[22] Filed: Oct. 8, 1996

[51] Int. Cl.$^6$ ................................. G11B 9/00; H01J 3/14
[52] U.S. Cl. ........................... 369/116; 369/112; 369/126; 250/216
[58] Field of Search ..................... 369/116, 112, 369/126, 43; 250/216; 427/162

[56] References Cited

U.S. PATENT DOCUMENTS

| | | | |
|---|---|---|---|
| 4,947,034 | 8/1990 | Wickramasinghe et al. | 250/216 |
| 5,125,750 | 6/1992 | Corle et al. | 369/43 |
| 5,484,558 | 1/1996 | Guerra | 427/162 |

FOREIGN PATENT DOCUMENTS 6-139647  5/1994  Japan .

Primary Examiner—David C. Nelms
Assistant Examiner—Kim-Kwok Chu
Attorney, Agent, or Firm—Francis J. Caufield; Joseph Stecewycz

[57] ABSTRACT

An optical recording and retrieval system and method that employs phase-controlled evanescent field illumination to optically encode and decode information at full-field and in real-time or substantially real-time. The system is particularly useful for high density information storage in media in which submicron optically active sites are formed. The light waves comprising the evanescent electromagnetic field are inhomogeneous in that their planes of equal phase are substantially perpendicular to the direction of propagation and to their planes of constant amplitude. The planes of equal phase are therefore normal to the surface to which the evanescent field is adjacent and to an optical recording media surface illuminated by this field as well. By controlling the phase of the source of illumination and analyzing the output from or beneath the surface, either by phase analysis or phase to amplitude decoding, subwavelength lateral surface feature resolution is enhanced without sacrificing vertical resolution. Methods and means for dynamic or static phase shifting of inhomogeneous waves comprising the evanescent field are disclosed.

51 Claims, 10 Drawing Sheets

PHASE CONTROLLED EVANESCENT FIELD SYSTEMS AND METHODS FOR OPTICAL RECORDING AND RETRIEVAL

BACKGROUND OF THE INVENTION

1. Field of the Invention

This invention in general relates to the field of optical storage and retrieval and, more specifically, to systems and methods that use phase controlled evanescent field illumination in real-time, whole-field imaging for purposes of optical recording and retrieval.

2. Description of the Prior Art

Use of evanescent fields for measuring and visualizing submicron surface topographic features is known. Descriptions of the use of evanescent fields are contained, for example, in Harrick, N.J., "Use of Frustrated Total Internal Reflection to Measure Film Thickness and Surface Reliefs," *J. Appl. Phys.*, 1962, 33: p. 321; McCutchen, C. W., "Optical Systems for Observing Surface Topography by Frustrated Total Internal Reflection and by Interference," *The Review of Scientific Instruments*, Vol. 35, pp. 1340–45, 1964; and Guerra, J. M., Plummer, W. T., 1987, "Optical proximity imaging method and apparatus," U.S. Pat. No. 4,681,451, assigned to Polaroid Corporation.

Harrick, McCutchen, and Guerra/Plummer disclose whole-field reflected evanescent light microscopes where the sample is not transilluminated nor scanned, but rather is illuminated by an evanescent field from an unrestricted total reflection surface at the object plane of an epi, or reflected light, illuminator. Here, the sample can be opaque or transparent, thick or thin, and can be viewed in real-time with high energy throughput. Such microscopes are very sensitive to smooth surfaces because of their use of the exponentially varying amplitude of the evanescent field in the vertical direction to sense very small surface height variation. On the other hand, rougher surfaces scatter light back into the microscope, which decreases contrast and sensitivity. Also, the deeper topography is rendered as bright, because these areas penetrate the evanescent field to a small degree so that the epi-illumination is nearly totally reflected. The difficulty in detecting and measuring small changes in bright scenes limits the observable topographic depths to about ¾ of the illuminating wavelength (which is the wavelength in air divided by the index n and the sine of the incident angle I). Further, the illumination and imaging optics are coupled because the objective serves as the condenser as well. In a practical sense, this limits the use of such instruments to the availability of suitable commercial objectives, magnifications, fields of view, and numerical aperture. In addition, because of the coupling of imaging and illumination optics, it is difficult to affect the polarization, phase, incident angle, and direction of the illumination. This, in turn, restricts the ability to maximize the tunneling range, to increase lateral resolution, or to tunnel through less rare media, such as water in biological applications.

Devices in which evanescent light from transilluminated samples is scattered into objective pupils are described in G. J. Stoney, "Microscopic Vision," Phil. Mag. p. 332, specifically pp. 348–49, 1896; Ambrose, E. J., "A Surface Contact Microscope for the Study of Cell Movements," *Nature*, Nov. 24, 1956, Vol. 178; Ambrose, E. J., "The Movements of Fibrocytes," Experimental Cell Research, Suppl. 8, 54–73 (1961); Temple, P. A., "Total internal reflection microscopy: a surface inspection technique," *Applied Optics*, Vol. 20, No. 15, Aug. 1981; and D. Axelrod, in *Fluorescence Microscopy of Living Cells in Culture, Part B*, edited by D. L. Taylor and Y-L. Wang, (Academic Press, New York, 1989), Chap. 9. Stoney, Ambrose, Temple, and Axelrod disclose optical evanescent light field microscopes in which the light that enters the objective pupil is evanescent field light that has been scattered from a sample surface. However, in all of these microscopes, the sample is transilluminated, with the illumination incident at beyond the critical angle such that the evanescent field from the sample surface is received. It is necessary then that the sample be transparent at optical frequencies, or is made thin enough to be transparent.

Scanning devices which rely on scattered evanescent field light are described in Fischer, U. Ch., Dürig, U. T., and Pohl, D. W., Jan. 25, 1988, "Near-field optical scanning microscopy in reflection," Appl. Phys. Lett., Vol. 52, No. 4, pp. 249–51. Fischer et al disclose a near-field optical microscope in which the sample is not transilluminated but is rather illuminated in reflected light. Further, this reflected light is in the form of an evanescent field from a dielectric plate into which light is launched at greater than the critical angle by means of a coupled prism so that it undergoes multiple total internal reflections, giving rise to the evanescent field. However, Fisher et al restrict the evanescent field with an aperture in a metal opaque coating on the total reflection surface of the dielectric plate. This aperture is smaller than the wavelength of light so that an improvement in lateral resolution beyond the normal Abbe limit is achieved, but at the cost of having to scan the aperture relative to the sample to build up an image. A further cost is that energy throughput is very low, making extension to analytical optical techniques such as spectroscopy problematic.

Devices which utilize transillumination of transparent samples are described in R. C. Reddick, R. J. Warmack, and T. L. Ferrell, "New form of scanning optical microscopy," Phys. Rev. B 39, 767–70 (1989). Reddick et al. discloses transillumination of thin and transparent samples with evanescent light, but the entrance pupil in Reddick et al. is not an objective in the conventional microscopy sense. Rather, it is an optical fiber that is scanned over the sample, close to the sample surface. Thus, there is a loss of flux throughput, and vertical resolution is limited by the mechanism that controls the vertical position of the fiber relative to the sample. A means of scanning in the xy plane is also required, preventing true real-time whole-field imaging.

In addition to the use of evanescent fields and scattering for imaging and other purposes, phase shifting interferometry has played important roles in different contexts. For example, the wave nature of light has been beneficially employed in optical microscopy where vertical height resolution is limited to $\pi/2$. Here, interference between wavefronts can be employed to increase vertical resolution and contrast. Interference between wavefronts with a static, or fixed phase shift as in differential interference contrast microscopy, invented by Nomarski (G. Nomarski, *J Phy. Rad.* 16, 9S (1955)), or phase contrast microscopy invented by Zernike (1935), results in a contrast enhancement so that normally unresolved, substantially subwavelength vertical differences are made visible. Typically, the unifying principle behind the many manifestations of interferometers is that a reference wavefront is made to interfere with an unknown. In the last case, the wavefront is combined with a phase-shifted version of itself.

In other interferometers, a controlled, known reference wavefront is split into two wavefronts. One is disturbed by the sample, and the disturbed wavefront is recombined with the reference. The resulting interference image, or interference map, is analyzed to determine vertical information about the disturbing sample surface.

In all manifestations, phase can be measured to better than one part in one hundred of the wavelength, π. This high resolution, well beyond the Abbe limit, is termed superresolution, but is only in the vertical axis. Spatial resolution in the XY plane remains at best π/2.

Interference microscopes, such as have been available commercially from WYKO and ZYGO, also achieve vertical resolution of π/100, or better, through dynamic phase shifting with, for example, a piezo-actuated reference window. The phase shifting causes a multitude of sequential interference images, each the result of a discrete and unique phase shift, in which the interference information is manifested as an amplitude or light intensity variation in the spatial image plane. While the data from each of the multitude of interference images, or maps as they are sometimes called, must be reduced to obtain the final image, the resolution is remarkable and, unlike Nomarski and phase contrast, quantitative. The shifting must be over at least one complete fringe in order to extract full information. The vertical range of this phase shifting technique is about half the wavelength of the illumination.

While the art describes a variety of devices that utilize evanescent field illumination for investigating vertical surface characteristics, there remains a need for improvements that offer advantages and capabilities not found presently in optical storage and retrieval systems, and it is a primary object of this invention to provide such improvements.

It is another object of the invention to apply methods and means of phase shifting and phase shifting interferometry to the phase of the inhomogeneous waves comprising evanescent fields to achieve superresolution in the lateral spatial plane for use in optical storage and retrieval.

Another object is to employ lateral phase shifting to achieve superresolution imaging in optical systems using evanescent field illumination, while maintaining whole field (rather than scanning) imaging, for optical storage and retrieval.

Another object is to control the phase of the evanescent field by illuminating a diffractive structure with a spatial grating period smaller than the illumination wavelength so that the evanescent modes are phase locked to the diffracting structure, and then to provide means to modify the grating period in order to shift the evanescent field phase for optical storage and retrieval purposes.

Other objects of the invention will be obvious, in part, and, in part, will become apparent when reading the detailed description to follow.

SUMMARY OF THE INVENTION

Imaging devices employ phase shifting and analysis of phase controlled evanescent light to provide enhanced ability to image and/or resolve substantially subwavelength optically active features located on or beneath a surface of an optical storage medium illuminated by the phase controlled evanescent light. With the enhanced resolution through the use of the phase controlled illumination, enhanced optical storage capacity is made possible, especially because of enhanced lateral resolution. Typically, the optically active features in the recording medium are physical pits or phase-changing sites by which information has been encoded, and they may exist just on the surface or can be distributed beneath the surface and as pits of different depth.

The light waves comprising the evanescent electromagnetic field are inhomogeneous in that their planes of equal phase are substantially perpendicular to the direction of propagation and to their planes of constant amplitude. The planes of equal phase are therefore normal to the surface to which the evanescent field is adjacent and to a sample surface illuminated by this field as well. By controlling the phase of the source of illumination and analyzing the output from the surface, either by phase analysis or phase to amplitude decoding, subwavelength lateral surface topography is enhanced without sacrificing the detail of vertical features. Methods and means for dynamic or static phase shifting of inhomogeneous waves comprising the evanescent field are disclosed, as well as other non-imaging applications.

In accordance with a further feature of the invention, the phase shift and analysis can be static (constant) or dynamic.

In accordance with other features of the invention, the phase shift and analysis is achieved by control and selection of illumination wavelength, use of two wavelengths, polarization state control including electro-optic modulation, incident angle, azimuthal incident angle, optical cavity control, and phase retardation, where control in all embodiments may be for either unidirectional or omnidirectional incident illumination.

In accordance with yet another feature of the invention, the phase shift and analysis are adapted to a photon tunneling microscope for superresolution lateral imaging.

In accordance with yet another feature of the invention, the means of controlling and shifting the phase of the evanescent field is a diffractive structure with variable grating period substantially less than the illumination wavelength, where the phase of the evanescent modes thus formed is locally locked to the diffraction structure, and the variable grating period can be tuned.

In accordance with yet another feature of the invention, the means and methods of phase shifting are adapted to the evanescent field from highly bound waves, such as at the tip of an optical scanning probe that is an optical waveguide operated below its cutoff frequency to reduce the effective aperture of the probe and thus increase lateral resolution.

In accordance with yet another feature of the invention, the means of controlling the phase of the evanescent field surrounding the core of an optical waveguide or scanning probe is in the form of a Bragg reflector stack of dielectric layers, such that the effective aperture of the probe is reduced over the normal metallic aperture.

In accordance with yet another feature of the invention, means to control and shift the phase of the evanescent field is a plurality of close-packed tapered waveguides operated below their cutoff frequency, where the phase of the resulting evanescent field is locked to the individual waveguides, with additional means to locally scan the plurality of probes laterally over a small distance.

In accordance with yet another feature of the invention, the plurality of close-packed tapered waveguides are arranged to form a phase-array synthetic aperture.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

This invention generally relates to the fields of surface and subsurface imaging and fine detail measurement of subwavelength optically active features through the application of phase-controlled evanescent field illumination. In particular, the invention relates to methods and apparatus by which phase-controlled bound evanescent field illumination is converted by frustration of total internal reflection and/or scattering into propagating light that is subsequently collected and imaged for downstream display and optical recording purposes through the use of analysis and image processing techniques for decoding the phase encoded information contained in the propagating radiation. A number of different phase control evanescent field illumination embodiments are described which have utility in their own right but which are combined with other inventive features for optical storage and retrieval purposes, as will subsequently become evident.

Figure 1:
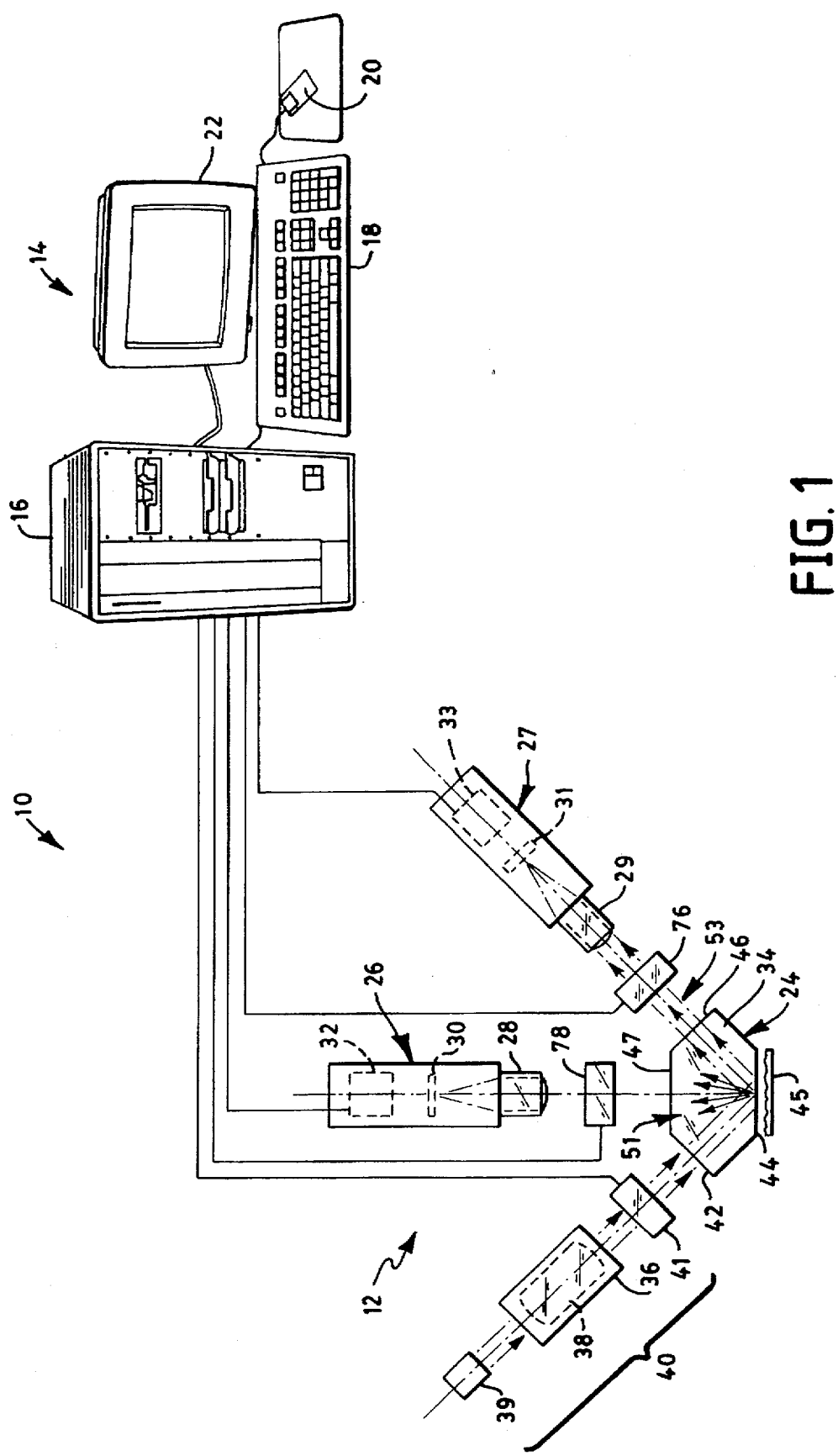
FIG. 1 is a diagrammatic partially elevational and partially perspective view of an imaging and metrology system of the invention employing a phase controlled evanescent field illumination section.

Reference is now made to FIG. 1 which shows generally, a phase controlled evanescent field imaging system 10 which serves as the basis for use in optical storage and retrieval in a manner to be subsequently described. However, before describing the use of system 10 for optical storage and retrieval purposes, its general features and mode of operation will first be described. As will be seen, system 10 is particularly suitable for full-field, video visualization and detection of microtopographic and subsurface features of media having surface characteristics ranging from smooth to rough or combinations of partially refracting/diffracting (specular) to partially scattering (rough), or, more generally, to any optical properties (e.g., micro spatial index variations) capable of converting bound evanescent fields to propagating radiation. As will be further seen, system 10 collects propagating light in specular form to assess characteristics of smooth surfaces, and collects propagating light in scattered form for assessment of rougher surfaces. In assessing smoother surfaces, images appear as dark against a light background and in the assessment of optically-scattering surfaces, images are light against a dark background (i.e., "dark field" images). In addition to the use of system 10 for optical recording, the disclosed system and other embodiments of the invention are also suitable for use in measuring the surface characteristics of aircraft and space vehicle structures, paint, paper, and fabrics. Because of the lighting and detecting mechanisms employed in dark field imaging, it is possible to decouple the illumination and imaging paths so that probes remote from the imaging sections can be contrived.

As seen in FIG. 1, system 10 comprises an illumination and image formation section 12 and an image processing and display section 14. Section 14 comprises any well-known general purpose computer or work station 16 having a CPU, RAM memory, hard and floppy drives, input devices such as a keyboard 18 and mouse 20, and color display monitor such as at 22. Preferably, computer 16 has 16 or more megabytes of RAM and is otherwise equipped with high throughput data and video buses. The internal video card is preferably one selected with two or more megabytes of on-board memory and is capable of generating 32-bit or more colors for high tone resolution. Internal signal and image processing programs are stored on the internal hard drive of computer 16 for transferral to RAM in the usual way for processing needs as required.

As best seen in FIG. 1, illumination and imaging section 12 comprises an optical head 24, for facilitating illumination of and proximity with the surface of a sample to be visualized and measured, and video cameras 26 and 27, for collecting and imaging propagating radiation from the surface of a sample.

Video cameras 26 and 27 may be any suitable conventionally available type of the desired spatial and tonal resolution. Preferably, each of video cameras 26 and 27 is a wide-angle type and may have a magnifying or slightly minifying objective lenses 28 and 29, respectively. Objective lenses 28 and 29 each may alternatively be a zoom lens of appropriate tele- to wide-angle design. Alternatively, video cameras 26 and 27 may be coupled to microscopes.

Located at the plane of best focus of objective lens 28 is a photodetector 30, which may be a conventional CCD or vidicon tube. Video signals generated from photodetector 30 are digitized on board camera 26 via a resident chip 32 for that purpose or sent to an appropriate board resident in a slot in computer 16.

Located at the plane of best focus of objective lens 29 is a photodetector 31, which also may be a conventional CCD or vidicon tube. Video signals generated from photodetector 31 may be processed on board camera 27 via a resident chip 33 for that purpose or may be sent to an appropriate board resident in a slot in computer 16.

In either event, cameras 26 and 27 and computer 16 are configured in well-known manners so that video signals are digitized to generate digital images that are displayed on monitor 22 at video rates, or at nearly video rates, as image processing speed permits.

Optical head 24, in one preferred embodiment, comprises a bulk optic, prismatic dielectric body 34, having, inter alia, a light entering facet 42, a sample proximity facet 44 for contacting an adjacent surface of a sample such as that indicated at 45, and light-emitting facets 46 and 47. Alternatively, optical head 24 may be an aplanatic sphere. Optically coupled to facet 42 is a phase-controlled illumination section 40 comprising a collimating optical section 36 consisting of a tube in which are resident suitable collimating optics in the form of a well-known bulk optic lens system shown diagrammatically at 38. An illumination source 39 is provided, and radiation emitted by source 39 is directed via collimating optical section 36 through a phase controller 41 that acts as a means for controlling the phase of illumination directed toward optical head 24. Illumination source 39 preferably is of narrow bandwidth and may comprise an LED, laser, or other source provided with narrow bandpass filters to limit wavelength to predetermined ranges.

As will be seen subsequently, phase controller 41 and its functions may be provided by a number of different means and is preferably under the control of computer 16.

Figure 2:
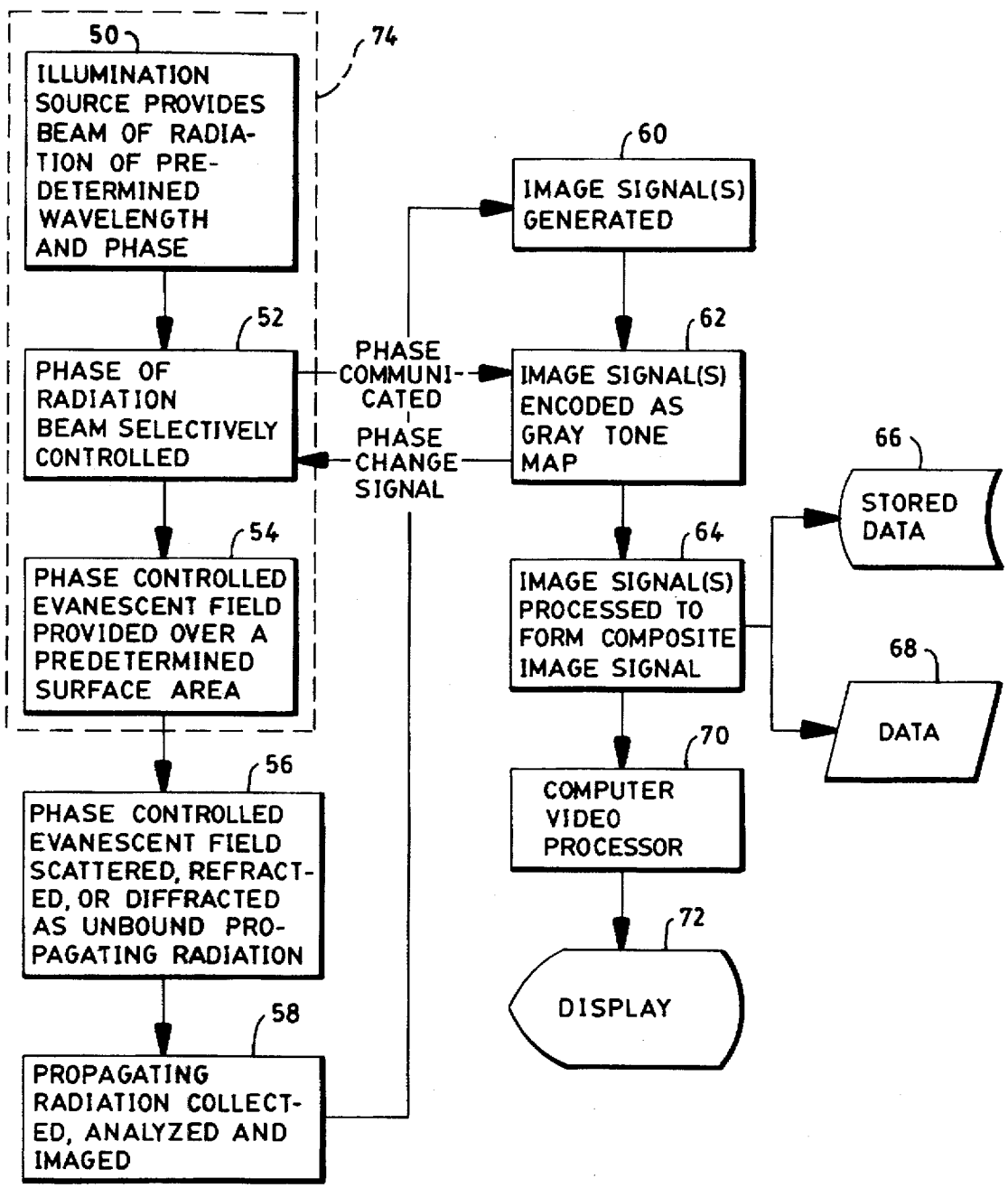
FIG. 2 is a flow chart illustrating the operation of the of the invention of FIG. 1.

FIG. 2 is a preferred flow chart for the general operation of imaging system 10. As shown in the chart, illumination source 39 first provides a beam of radiation of predetermined wavelength, phase, and numerical aperture, as designated in block 50. The phase of the beam of radiation is then selectively controlled, as indicated in block 52, and the phase is communicated to block 62, which also provides phase change control signals to block 52 to selectively modulate the phase as required. Once the phase is set, the phase controlled illumination enters optical head 24 to create an evanescent field that is bound to proximity surface 44 in a manner to be described. The bound phase controlled evanescent field is then reflected, refracted, diffracted, or scattered as propagating radiation, as indicated in block 56, when the near surface of a sample 45 is brought to proximity surface 44. Most sample surfaces will exhibit more or less refracted/diffracted or scattered radiation in accordance with their smoothness/roughness properties. When a surface is very smooth, it will predominantly reflect radiation and, when optically scattering, it will predominantly scatter radiation. Propagating radiation from smoother surfaces originates from frustrated total internal reflection at the boundary of proximity surface 44 and the contacting sample surface. This propagating radiation is designated generally at 53 (See FIG. 1).

Scattered radiation is generally designated at 51 and propagates over a solid angle dictated by the properties of the sample surface. Specular propagating radiation is analyzed by a phase analyzer 76 (FIG. 1) and imaged by video camera 27 while propagating scattered radiation is analyzed by a phase analyzer 78 and imaged via video camera 26, all components of which are under the control of computer 16, as indicated in block 58. The intensity of the propagating radiation varies as a function of the phase of the illuminating beam and the lateral position of local subwavelength topographic features of the sample's surface, and one could directly visualize the image from block 58 with the aid of a microscope.

For each phase of controlled radiation, the corresponding propagating radiation is analyzed and one or more image signals are generated in block 60. The signal varies in accordance with the imagewise variation in and in correspondence with the phase of the illuminating beam of radiation. It should be clear that either or both types of propagating radiation can be considered, and this may be done simultaneously or separately.

The image signal is encoded, as indicated in block 62, as a gray tone map in which tone levels indicate lateral and vertical features as a function of phase. This may be accomplished via a look-up table (LUT). The encoded image signals are then processed to form a composite signal, as indicated in block 64, and this information can be stored in memory, as indicated in block 66, or printed out as data in hard copy form, as indicated in block 68. The gray tone map signal is then formatted for 2D and 3D display via computer 16 or other suitable dedicated image processor. The composite formatted signal is then fed to a video processor in computer 16 from which it can be displayed on monitor 22, as indicated in block 72.

The amount of signal processing that occurs in block 64 to produce the composite image signal can vary depending on the task at hand. It can be as simple as subtracting two gray tone maps generated at different phases to provide an image in which edges will be enhanced, or can be a complex reduction of a series of sequential interference images in which interference information is manifested as an amplitude or light intensity variation in the spatial domain.

Figure 3B:
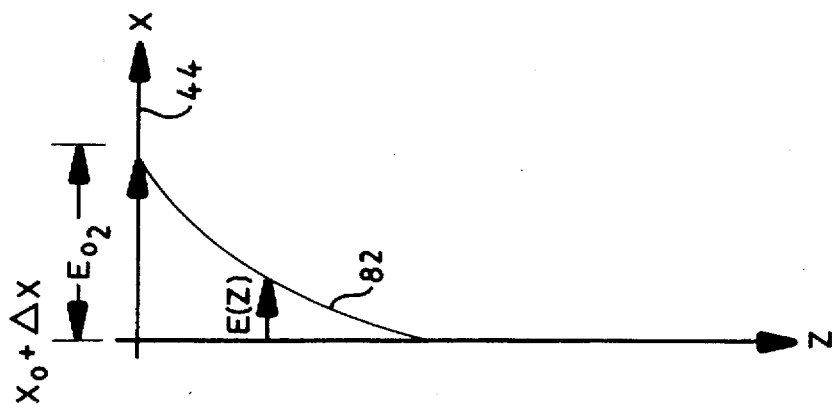
FIG. 3 is a diagram showing how the amplitude and position of an evanescent field is modified as a result of a phase change.
Figure 3A:
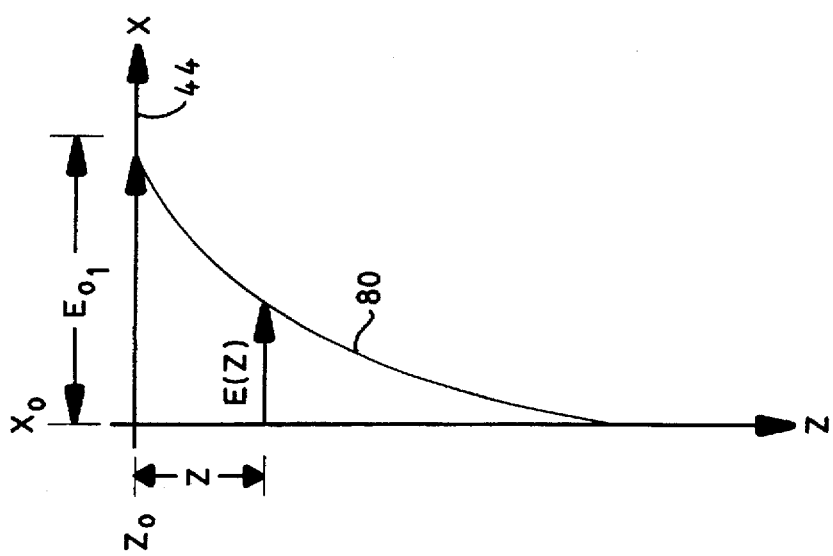
Figure 5:
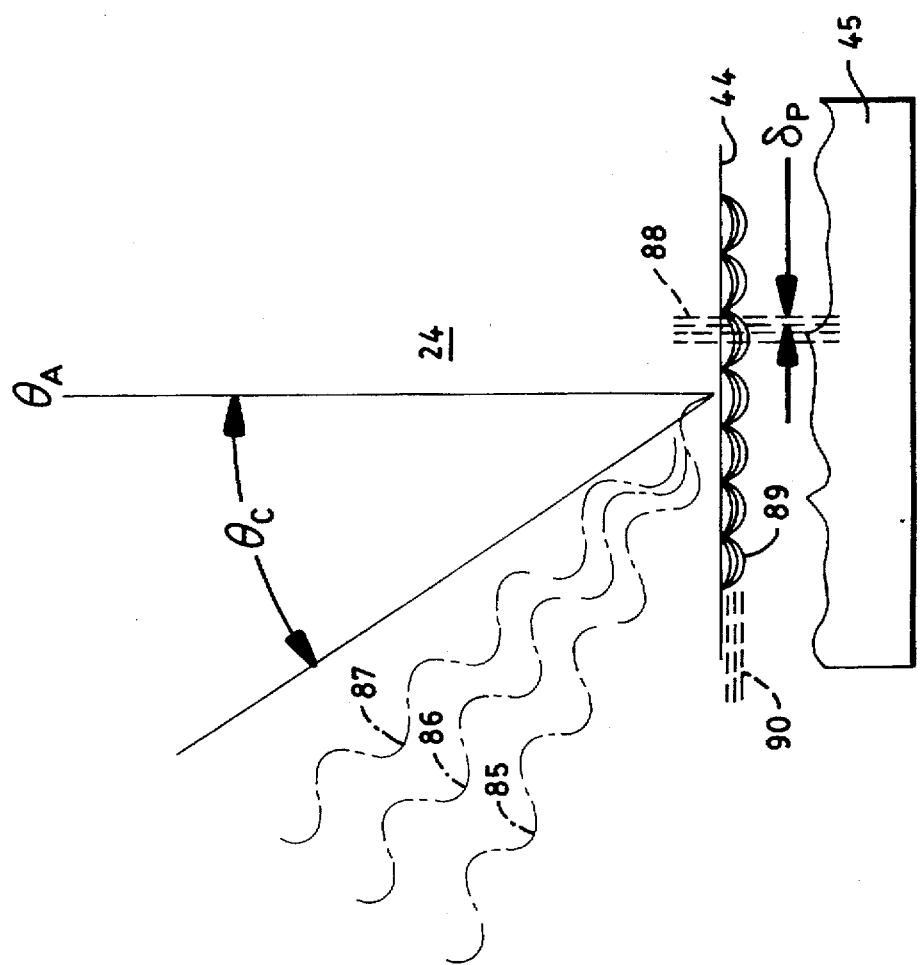
FIG. 5 is a diagram showing how a phase shift, $\delta_p$, results in a lateral shift in evanescent field light and thus spatial information in the XY plane.

To better understand how phase control and analysis of the evanescent illuminating field operates to achieve enhanced resolution in the lateral spatial plane, reference is now made to FIGS. 3 and 5.

As best seen in FIG. 5, the light transmissive dielectric body 34 (FIG. 1) of optical head 24 has light traveling through at an incident angle equal to or greater than the critical angle, $\theta_c$, so that the light totally internally reflects at the interface formed with a less dense medium, such as air or water (i.e., at facet 44). It is understood that dielectric optical head 24 can be transmissive over all or any part of the electromagnetic spectrum, including but not limited to ultra-violet, infra-red, or even x-ray and millimeter wave extremes, depending upon the application. Although the incident light is shown to preferably be a collimated beam comprising incident light waves 85, 86, and 87, the light need not be collimated and, in fact, imaging resolution improves if the incident light is less coherent.

As seen in the left of FIG. 3, an evanescent field 80 at a first phase angle, $\phi_1$, arises at the boundary between facet 44 and the lower index medium opposite facet 44 (this medium is usually air, but may be water or another low index medium). Evanescent field 80 has an amplitude that decays exponentially with distance from the surface of facet 44. The strength of evanescent field 80 is given by:

$$E_{evanescent} = E_0 \exp\left(-\frac{z}{d_p}\right) \quad (1$$

where $E_0$ is the phase dependent amplitude of the electric field associated with the photon in the medium comprising optical head 24, and $d_p$, is the penetration depth in the less dense medium at which $E_0$ decreases to $E_0/e$, and where:

$$d_p = \frac{\lambda_1}{2\pi(\sin^2\theta - n_{21}^2)^{\frac{1}{2}}} \quad (2$$

and $\lambda_1$ is the wavelength in the denser medium, $\theta$ is the incidence angle, and $n_{21}$ is the ratio of denser to lower indices of refraction at the boundary of facet 44. The actual penetration depth, where E falls to the limit of detectability, is dependent on these variables as well as both the photodetector sensitivity and the sample optical properties, and is typically approximately $0.75\lambda$. However, the evanescent field, however small in intensity, can exist sensibly for tens of wavelengths, if the parameters in equation (2) are optimized.

As is well-known in the relevant art, evanescent field 80 penetrates normal to the surface of facet 44 to the depth indicated above. Consequently, it extends beyond the physical boundary of facet 44 to a predetermined depth and can be interrupted by a sample placed in close proximity to facet 44.

The amplitude of evanescent field 80 in the proximity of facet 44 is $E_{01}$ and is phase angle dependent since the standing wave, $E_0$, is a superposition of the incident and reflected waves at the total reflection interface (i.e., the boundary between high and low index media) and has an electric field amplitude, $E_0$, $$E_0 = 2\cos\left[\left(\frac{2\pi z}{\lambda_e}\right) + \phi\right] \quad (3$$

of twice the amplitude of the standing wave at the given phase from addition of the incident and reflected wave, and has an evanescent wavelength $\lambda_e$, $$\lambda_e = \frac{\lambda_1}{\sin\theta} \quad (4$$

where $\lambda_1$ is $\lambda/n_1$, the free-space wavelength divided by the refractive index of the medium 1 [in this case, medium 1 is the denser medium of the optical head 24]. The standing wave and penetrating wave are normal to the surface.

Referring now to the right side of FIG. 3, it can be seen that there is another evanescent field 82 whose amplitude, $E_{02}$, at the proximity facet 44 is smaller than that of $E_{01}$ in accordance with equation (3) where that phase angle is now $\phi_2$. Also notice that the change in phase angle has shifted the evanescent field laterally in x from position $x_0$ to position $x_0+\delta x$. This lateral shift, coupled with the reduction in amplitude with phase, is an important property of phase-controlled evanescent field illumination that is exploited to advantage by this invention. It should also be noted that with evanescent fields, there are planes parallel to the proximity facet 44 that represent planes of equal amplitude at a particular phase, while planes of equal phase are perpendicular to the planes of equal amplitude and laterally positioned as a function of phase angle value.

The relationship between the planes of constant phase and planes of constant amplitude for propagating light versus the evanescent field arising from tunneling light, in this case from refraction beyond the critical angle, is illustrated in FIG. 5. Radiation, exemplified by light waves 85, 86 and 87, is incident at greater than the critical angle, $\theta_c$, from the optical axis, $O_A$. Now the proximity facet 44 totally internally reflects until the surface of sample 45 penetrates the resulting evanescent field, indicated generally at 89. The planes of equal phase, indicated at 88, are perpendicular to the proximity facet 44 of optical head 24, to the surface of sample 45, and to the planes of equal amplitude 90, so that a phase difference, $\delta_p$, results in a lateral shift in the evanescent field light and thus is able to yield spatial information in the XY plane (where Y is into the figure). As the incident angle increases for incident light waves 87, 86, and 85, respectively, the penetration of proximity facet 44, and thus the amplitude of the evanescent field, decreases. There is also a lateral phase shift between these wavefronts because of the difference in incident angle, but this is not shown for clarity. As the phase of the incident illumination changes, the constant phase planes of the illumination sweeps across the sample surface features in the XY-plane. As it does so, the phase of the propagating radiation is modulated by just the lateral features of the sample since these features are the only source by which the propagating radiation may be modulated under these conditions.

Figure 4:
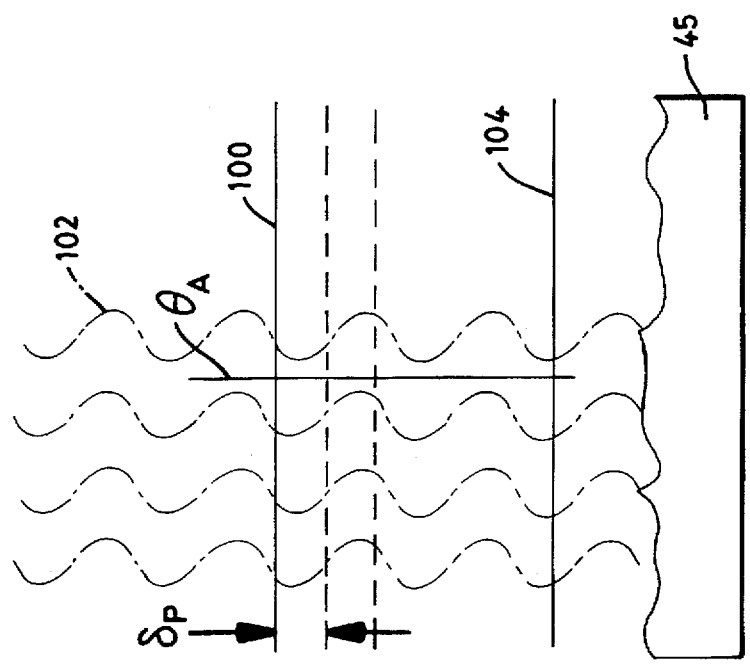
FIG. 4 is a diagram showing how a conventional phase shift, $\delta_p$, results in an axial shift in propagating light and thus height information.
Figure 7:
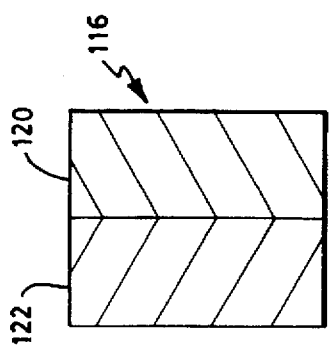
FIG. 7 is a diagrammatic planar view showing the phase shifting device of FIG. 6.

Reference is now made to FIG. 4 which, by contrast, shows the phase and amplitude relationships that hold in a normal propagating optical microscope. Here, the planes of equal phase 100 and equal amplitude are parallel and a phase shift, $\delta_p$, of the propagating incident light 102 in, for example, an optical light microscope, results in an axial shift in the propagating light 102 as seen by the surface of sample 45, where the reference surface may be that of an objective or prismatic optical head, whether dry or oil immersion, as indicated by the solid line 104. The planes of constant phase 100 are coplanar with the planes of constant amplitude (not shown) and are perpendicular to the propagation direction which for illustration is shown to be along the optical axis, $O_A$. In this case, which is the basis for traditional interferometry, phase information can yield only optical path measurement which, when applied to metrology of a sample surface, yields only height information, and not lateral information.

Figure 6:
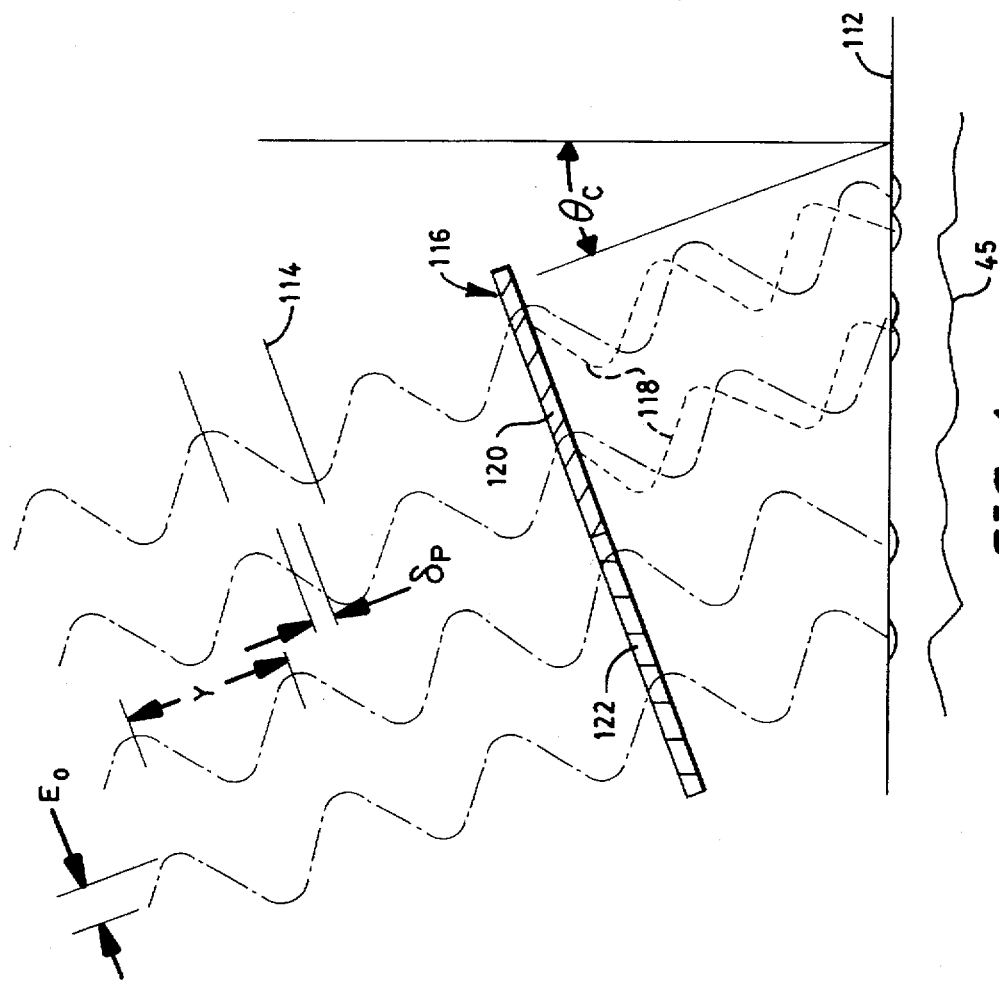
FIG. 6 is a diagram showing a propagating wavefront incident on a total reflection surface, showing the phase shift caused by a device inserted into the wavefront, with the device shown in elevation as a cross-section.

By way of further explanation, FIG. 6 shows a generic propagating wavefront 110, shown incident on a total reflection (TIR) surface 112 at greater than the critical angle, $\theta_c$. The incident wavefront 110 has wavelength $\lambda$ and amplitude $E_0$. Planes of constant phase 114 are normal to the propagation direction, and a phase differential $\delta_p$ is shown. A generic phase control device 116 (also shown as phase controller 41 in FIG. 1), inserted into the path of wavefront 110, shifts the phase of part of the wavefront 110 to provide phase-shifted wavefront 118 that has passed through a first segment of phase control device 116, indicated by 120. The phase of wavefront 118 is thus controllably shifted relative to the wavefront that passes through a second segment, indicated by 122. Phase control device 116 is shown here in a highly schematic and symbolic form, where the actual device can comprise a well-known differential phase plate, a differential polarizer, a differential color filter, or other phase-affecting optical device. The differential in phase between 120 and 122 is also rendered symbolically here. The actual geometry of the boundary between the areas of shifted phase can be annular, opposing slots, or other geometry as will be seen. Also, device 116, as symbolically shown, represents both static and dynamic phase shifting devices, with the latter including, but not limited to, tunable optical cavities, electro-optic modulators, piezo-actuated reference plates, phase conjugate mirrors, or other. Some of these will be shown and discussed subsequently.

Figure 8:
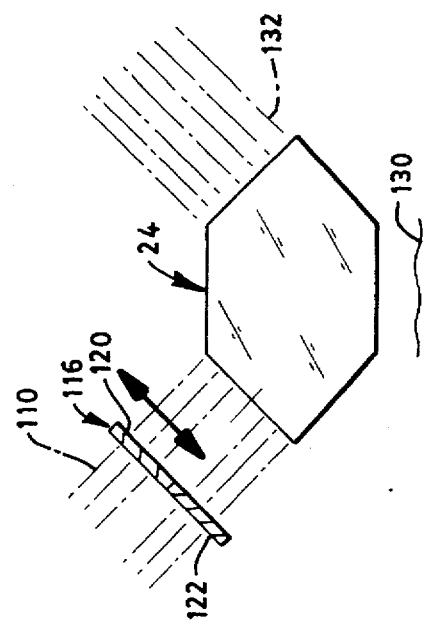
FIG. 8 is a diagrammatic elevational view showing the phase shifting device of FIGS. 6 and 7 in combination with a prism and sample.

Referring now to FIG. 8, phase control device 116 is shown in combination with a total internal reflection prism, such as prismatic optical head 24, and sample surface 130, where the incident light 110 is phase shifted by device 116, and the exiting light 132 is then phase analyzed through, for example, interferometry or polarimetry in order to extract the lateral phase information about surface 130 as encoded propagating radiation 132. The phase analyzer shown may be either phase analyzer 76 or 78 (seen in FIG. 1).

Interferometry through phase shifting of the evanescent field, as described here, benefits any optical device that employs evanescent illumination. Other examples to be subsequently discussed include: near-field proximity masks, near-field scanning microscopes, the photon scanning optical microscope, and the photon tunneling microscope disclosed in patents in the references above hereinabove. With phase control, the photon tunneling microscope enjoys lateral resolution approaching, through phase measurement, its high vertical resolution, which is attained through amplitude measurement of the decaying evanescent field, because the phase of light can be measured to up to a hundredth part of the wavelength. The nonscanning, high speed acquisition, whole field image is retained while the lateral resolution is typical of a scanning optical near-field probe microscope.

For example, the phase of the evanescent light can be shifted by: i) changing the incident angle of illumination by some amount (where the angle is already beyond the critical angle for total reflection), or ii) keeping the incident angle fixed but selecting a particular polarization.

A sweeping fringe can be created accordingly in method (i) by means of interference between two coherent light sources separated by a specified angle, where the separation angle is variable and one of the sources is fixed, or where the separation angle is fixed and the sources are moved together angularly. In method (ii), a sweeping interference fringe is generated between two polarizations of the light source. This is best done at the principal angle, where the phase difference between the parallel and perpendicular polarizations is at a maximum. The polarization of the incident illumination, if the illumination is omnidirectional, can be controlled with a rotated Brewster angle polarizer or a tourmaline plate cut so that it passes light polarized at right angles to its optical axis, or a similar device.

In both cases the fringe is swept along the sample and is modulated by the lateral variations in the sample. The subwavelength lateral variations are revealed by the deviation of the fringe from the reference fringe with phase angle, for example, $\phi$ of equation (3) set to zero. With this technique, the lateral resolution is determined by how fine the phase can be controlled, or resolved, and this is substantially less than the wavelength and Abbe resolution limit.

Another phase shift occurs at the NA=1 junction, where the light incident at greater than the critical angle, after being totally internally reflected, is shifted by $\pi$, while the specularly reflected light at less than the critical angle is shifted to a degree varying with the incident angle. This can be either a static or a dynamic shift.

The above discussion has largely assumed a collimated to weakly-converging beam, so that the incident illumination waves are almost planar. However, the same invention applies to more strongly converging, highly bound beams as well. Such beams can be the result of refraction in very high numerical aperture optics, but are also caused by placing a subwavelength diameter aperture in the total reflection surface. Apertures that are smaller than the illumination wavelength are used in so-called near-field optical scanning microscopes to increase lateral spatial resolution. However, even these microscopes can benefit from the lateral phase shifting disclosed here because the aperture size, and thus resolution, is ultimately limited by the finite transmission of the aperture itself.

In addition, a plurality of such probes, as will be seen, arranged in an array can scan a very small area, but the knitting together of these small scans, with the scanning done in parallel, results in very fast image acquisition. The scanning motion itself is at the same time shifting the phase planes along the sample surface. Further, the plurality of probes can be arranged to form a phased array synthetic aperture.

Another property when the incident illuminating wavefront is non-planar is that energy flows in the XY plane in the evanescent field. This results in a beam shift upon reflection, known as the Goos-Haenchen or GH shift. Therefore, selecting the azimuthal direction of the incident light rotates the GH shift and is a form of phase-shifting unique to evanescent light. Also, the choice of polarization affects the azimuthal direction of energy flow in the evanescent field.

Though interference between the disturbed and reference wavefronts is the preferred technique, direct subtraction of CCD frames taken at two phase angles also yields increased information about lateral features in a form of phase contrast (indicated by block 64 in FIG. 2).

Phase shifting of an evanescent field that arises from diffraction is also advantageous. It can be shown that the wavelength of the inhomogeneous waves in the evanescent field caused by diffraction from a normally illuminated plane grating with subwavelength grating spacing is determined by the spatial frequency of that grating, and so can be very small. The phase is therefore locked to the grating structure, so that altering the grating period similarly shifts the equal phase planes in the evanescent field. The grating can be modulated through acoustic, piezo, or other means, as will be discussed hereinafter.

In general, evanescent illumination is also advantageous in optical recording because of the high field strength and the smaller wavelength evident in equation (2) above. Adding the phase shifting and detection described above to the evanescent illumination allows even higher information storage density as will be discussed hereinafter.

Figure 9:
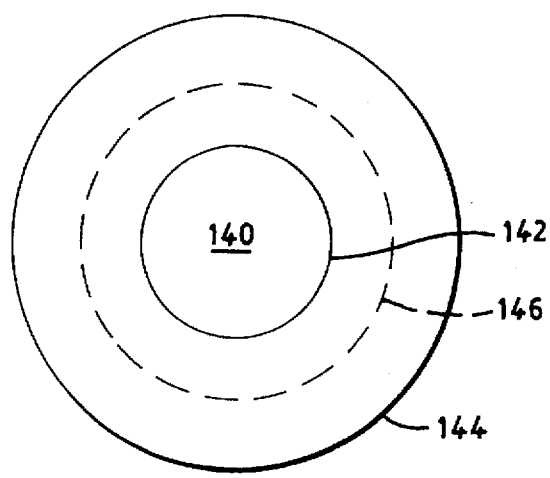
FIG. 9 is a diagrammatic planar view of a phase shifting plate for insertion in the optical path upstream of the prismatic element of FIG. 1.

Reference is now made to FIG. 9 where it is shown that phase control device 116 may take on an annular geometry to coincide with the numerical aperture of a microscope objective, such as that found in a photon tunneling microscope. Static phase shift by annular phase masks is practiced in phase contrast microscopy, except that here the masks operate at numerical apertures greater than one so as to affect only the evanescent light. Zone 140 coincides with numerical aperture (NA) less than one, which is the specular light, while boundary 142 is at the critical angle, and zone 144 is at the maximum numerical aperture of the objective. The dotted circle 146 indicates the boundary between two annuli that cause differential phase in a wavefront passing through them. More than two such zones can be added, and the phase shift between the zones can be static or dynamic, preferably under the control of computer 16. The phase shift can arise from optical path difference, polarization, wavelength, or incident angle, for example, with respective means of phase analysis chosen accordingly.

Figure 10:
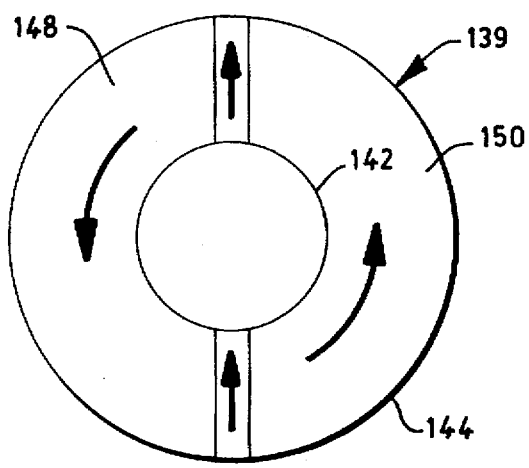
FIG. 10 is a diagrammatic planar view of a linear polarizer for use in controlling phase shifting, such as in the system of FIG. 1.
Figure 11:
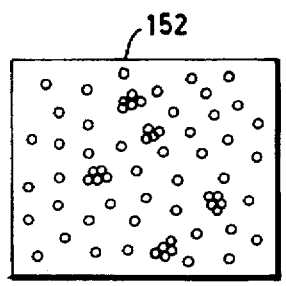
FIG. 11 is a diagrammatic view of an image area.

In FIG. 10, the geometry of a phase shifting plate 139 comprises a slot aperture 148 and an opposing slot aperture 150. Additional slots can be added, and the angle between the slots can be other than x. Once again, the critical angle annulus is indicated at 142, and the maximum numerical aperture is indicated at 144. This geometry is particularly useful with polarization. The plate 139 and slots can be static but are more useful if rotated about the optical axis, as indicated by the arrow arcs. A typical image 152 in FIG. 11 obtained in this way is the result of frame subtraction between two rotational settings and shows the visualization of microspheres not visualizable with standard photon tunneling techniques. When rotated about the optical axis, the slotted plate 139 effects a phase shift in the evanescent field, even if the slot apertures are open, because energy flow in the lateral direction is caused to change azimuthal direction in the sample plane by virtue that the Goos-Hanchen (GH) shift.

Figure 12:
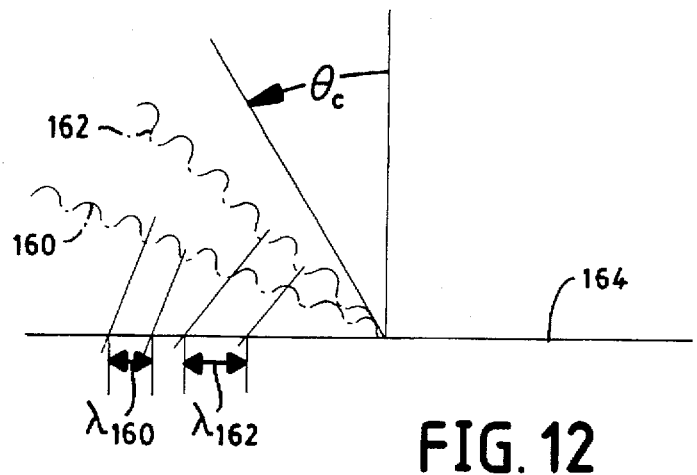
FIG. 12 is a diagrammatic view illustrating how angle of incidence can be used, either statically or dynamically, to control phase of evanescent field illumination.

In FIG. 12, the phase shift is accomplished by either statically or dynamically varying the incident angle, as between wavefronts 160 and 162, or alternatively, between either wavefront and a reference wavefront. As shown, the critical angle, $\theta_c$, is defined with respect to the optical normal, again $O_A$, and to a total reflection boundary 164.

Figure 13:
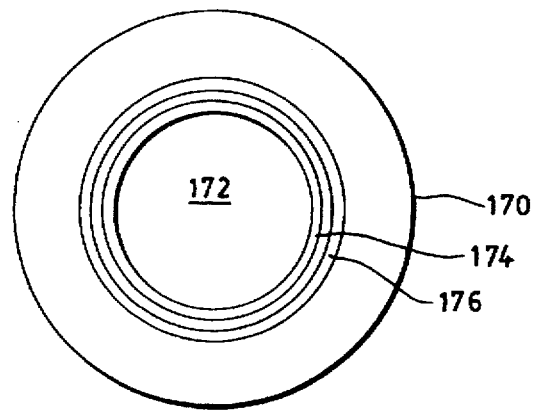
FIG. 13 is a diagrammatic planar view of a mask for selecting specific incident angles as shown in FIG. 12.

FIG. 13 shows a schematic of a static mask 170 for selecting specific incident angles (and therefore phase), with the critical angle annulus shown at 172, and the maximum numerical aperture at 170, corresponding to that of an objective. Selecting annular apertures are shown at 174 and 176.

Figure 14:
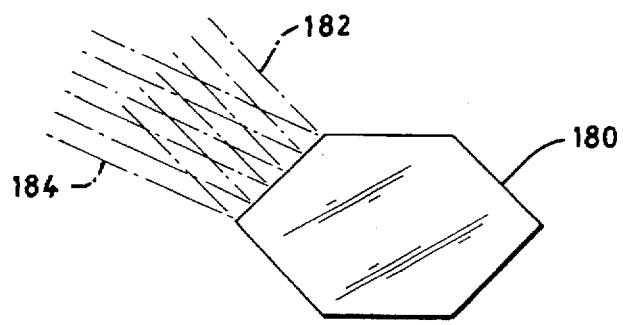
FIG. 14 is a diagrammatic view showing how incident angle may be selected when used in a prism arrangement.

For a simple total internal reflection prism 180 as shown in FIG. 14, wavefronts with incident angles 182 and 184 have different respective evanescent fields and different phase angles.

Figure 15:
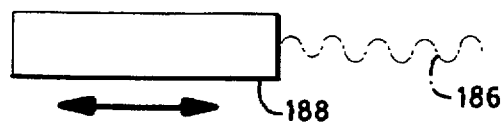
FIG. 15 is a diagrammatic view of phase shift accomplished by varying the optical path by physical axial movement as, for example, control by a piezo actuator.

Another embodiment for phase control which lends itself to dynamic phase shifting is shown in FIG. 15. Here, the phase shift can be accomplished by physical axial movement of the optical path 186, as controlled by a piezo actuator 188. Phase plates and tunable optical cavities are other ways to achieve this.

Figure 16:
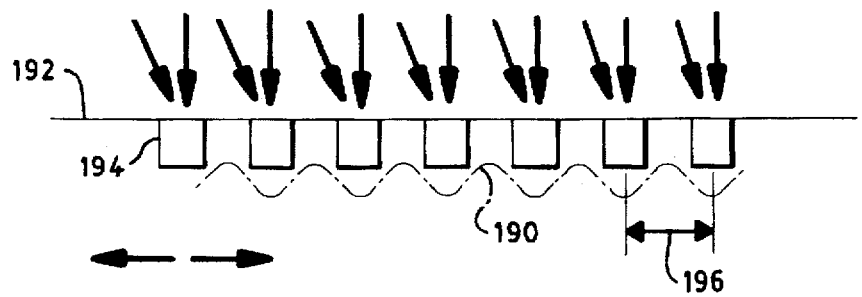
FIG. 16 is a diagrammatic elevational view of an evanescent field born of a subwavelength diffracting structure, with phase determined by structure geometry and with the structure dynamically adjustable for tuned heterodyning phase control.

FIG. 16 is a diagram of an evanescent field 190 born of a subwavelength diffracting structure 192 with phase determined by structure geometry 194, and with structure spatial frequency (period) 196 dynamically adjustable for tuned heterodyning phase control. Phase shifting is thereby accomplished with a tunable structure indicated generally at 195. The means for dynamically adjusting the structure period can be mechanical, such as piezo, thermal, or even humidity control, or through the use of a well-known acoustic surface wave. Phase shifting can also be accomplished with a static structure that has local spatial frequency variations or is moved relative to the sample surface. Here, control of phase of the evanescent field is by illuminating a diffractive structure with a spatial grating period 196 smaller than the illumination wavelength so that the evanescent modes are phase locked to the diffracting structure, and then to provide means such as, by way of example a piezo crystal modulator or tunable acoustic wave modulator, to modify the grating period 196 to shift the evanescent field phase. Here, an evanescent field arises from diffraction of the incident light by a structure with grating spatial period smaller than the wavelength of the light such that the diffracted orders are evanescent, where the local phase of the evanescent field is determined by and phase-locked to the local diffracting structure element.

Figure 17:
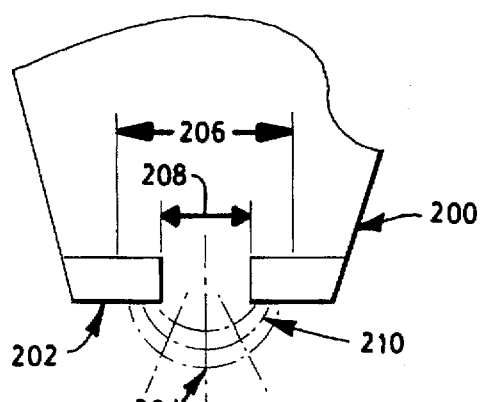
FIG. 17 is a diagrammatic elevational view of the evanescent field geometry in a near-field probe, showing how only the center of the field has equal phase planes normal to the probe so that phase shifting and restriction results in a smaller effective aperture and higher resolution.

As stated earlier, the benefits of phase shifting and interferometry apply to any optical device employing the evanescent field in which increased information in the lateral spatial plane is desired. In FIG. 17, for example, scanning near-field probe microscopes, which typically employ a tapered waveguide or optical fiber 200 with a substantially subwavelength tip aperture 208, utilize the evanescent field 210 thus caused to image a proximal sample surface by scanning the aperture over the surface (not shown). Because of the highly non-planar nature of the light from such an aperture, the radiative components in the field are substantial. Only the center of the field has equal phase planes 204 normal to the probe. Therefore, restricting the phase of the light results in a smaller effective aperture and higher resolution. Further, the lateral resolution is dependent on the effective aperture diameter 206, which is larger than the geometrical aperture because the metallized layer 202 of which it is formed is an imperfect conductor and cannot contain the light.

Figure 18:
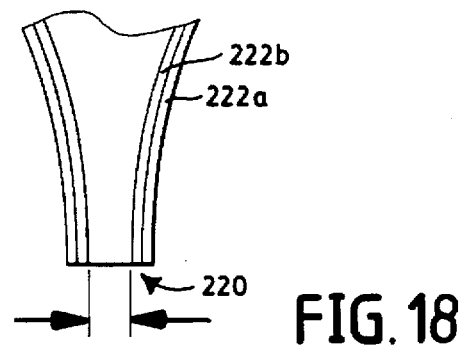
FIG. 18 is a diagrammatic elevational view of an improved near-field probe where the aperture is a multilayer stack Bragg reflector.

FIG. 18 diagrammatically shows an improved near-field probe where the aperture 220 is a multi-layer (indicated by 222a–c) stack Bragg reflector which acts upon the phase of the light to restrict the aperture. Only a few layers are shown for clarity, although any number of layers can be used. As is known in the art, such a structure typically consists of alternating high and low index materials to form an energy barrier impenetrable by light of a certain wavelength. Such a structure can be formed in many ways, however a preferred method is to draw a preform, comprised of the waveguide with scaled-up layer thicknesses, down to the final required size. Similarly, the drawing process just described lends itself to forming a plurality of such probes arranged in a close-packed matrix array.

Figure 19:
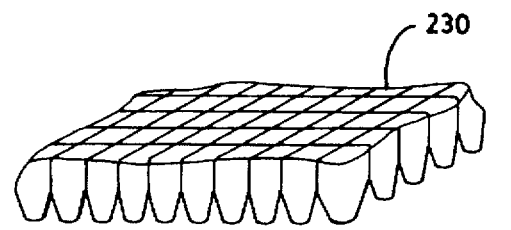
FIG. 19 is a partial diagrammatic perspective view of phase shifting matrix of probes moveable in the XY plane.

In FIG. 19, phase shifting can be accomplished with a matrix of probes 230 moved in the XY plane. Here, the close-packed matrix 230 is locally scanned over a small distance, so that lateral phase shifting is achieved in addition to increasing total scan area and reducing scan time where the matrix of probes 230 is arranged to comprise a phase-array so that together they form a synthetic aperture.

Thus, the invention has the ability to derive lateral spatial information about a surface illuminated with an evanescent field by controlling and then measuring the phase of the incident and returning light, respectively. The sample surface is the unknown, while the lateral phase is the known.

Figure 20:
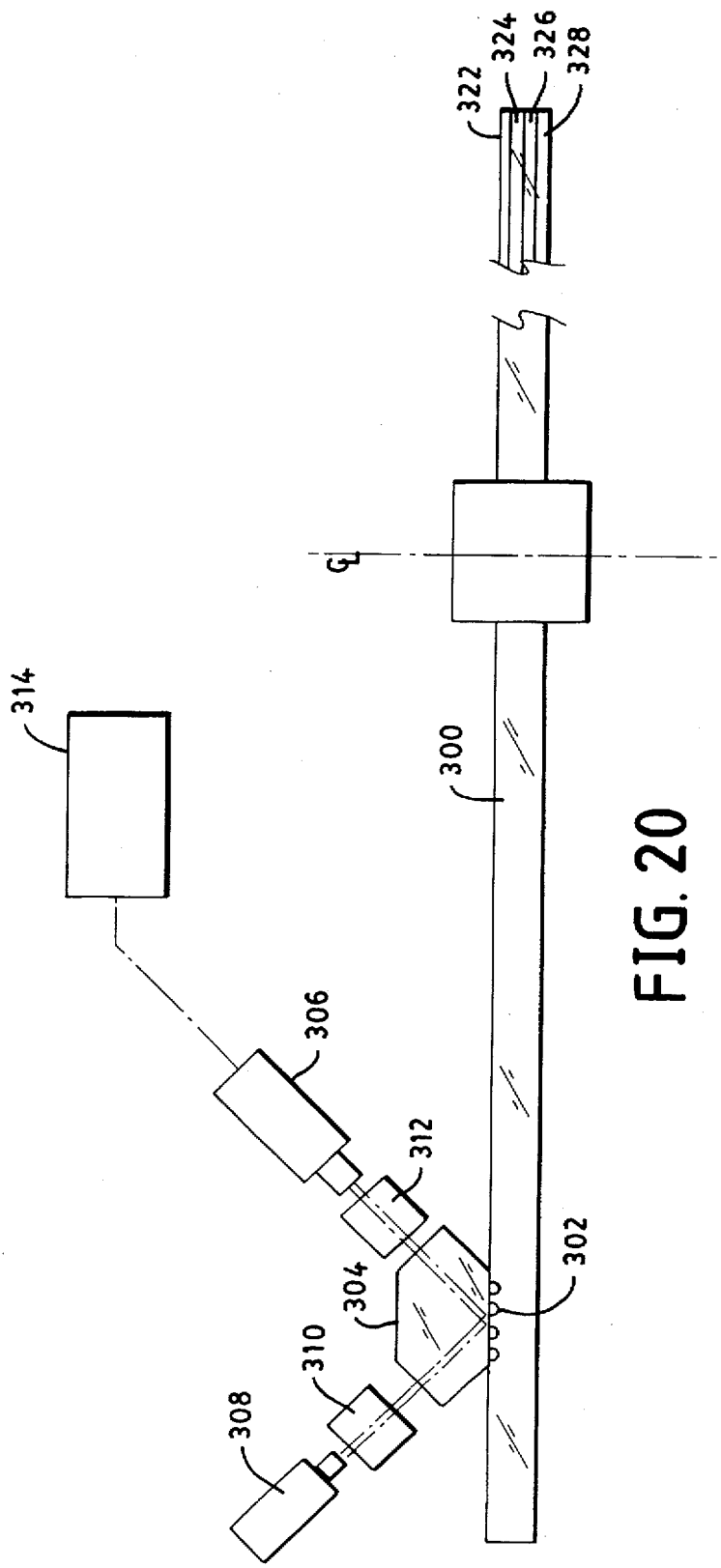
FIG. 20 is a diagrammatic elevational view of a system that employs phase controlled evanescent field illumination for reading and writing data in the optical domain to provide enhanced information storage densities in optical media via increased lateral spatial resolution.

Reference is now made to FIG. 20, which shows an arrangement by which phase controlled evanescent field systems can be beneficially employed to achieve high density optical reading and writing capability. In FIG. 20, a rotating polycarbonate or other similar optical compact disc 300, or a similar optical card scanned in the XY plane, contains data bits in the form of optical scatter, or other optical perturbance or optically active sites 302, on or very near the surface, or nanometer-high topographic bumps on the surface (not shown), to which the evanescent field is sensitive. The compact disc 300 may contain well-known semiconductor-doped, chalcogenide glasses, or suitable photopolymer layers for enabling formation of optically active sites. Optical perturbance sites 302 can also be of differing depths, or may exist beneath the surface as depthwise phase changing sites. The light transmissive media may also comprise a plurality of layers of different index of refraction as shown by layers 322, 324, 326, and 328 in FIG. 20 wherein the optically-active sites reside within those layers. A flying total internal reflection head 304 which can be configured as previously described serves to illuminate disk 300 with phase-controlled evanescent field light. The information bits convert the evanescent field to propagating light that is captured via a photodetector 306. Illumination and phase control are provided as before via a light source 308 and phase controller 310. A phase analyzer 312 is provided just upstream of photodetector 306. A processor 314 is used for analyzing the signal from photodetector 306. Alternately, the scatter sites or bumps can be internal to the disk 300. Furthermore, HOEs, kinoforms, micro lenses, or micro prisms can be formed in the surface of disk 300. As can be appreciated, phase control here greatly enhances the lateral resolution and thus packing density for the information carrying capacity of disk 300.

Figure 21:
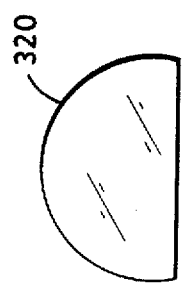
FIG. 21 is a diagrammatic elevational view of an aplanatic sphere that may be used in the system of FIG. 20.

FIG. 21 shows an aplanatic sphere 320 that can be beneficially used in place of flying total internal reflection head 304. The bottom surface of aplanatic sphere may also be provided with a diffractive structure for forming the evanescent field.

Figure 22:
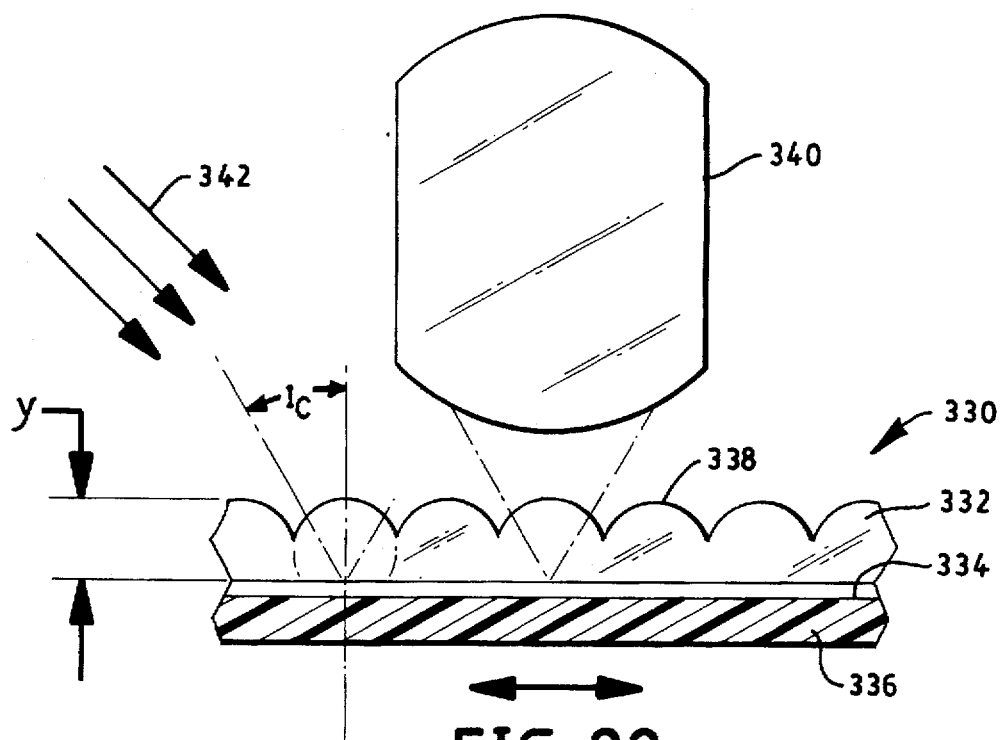
FIG. 22 is a diagrammatic elevational view, partially in section, of a media in which distributed optical means has been incorporated to receive phase controlled illumination and itself form an evanescent field.

While the foregoing systems employed optical means separate from the media for delivering the necessary phase controlled evanescent field illumination, it is also possible to have the optical delivery achieved by optical structures that form an integral part of the media. For example, there is shown in FIG. 22 an optical media 330 that comprises a distributed microlens 332 that overlies a writeable layer 334 that can have its optical properties locally changed as before. Beneath the writeable layer 334 is a substrate 336 for support and stiffness. The distributed microlens 332 has a higher index of refraction than that of the writeable layer 334, and consists of a series of periodic aplanatic lenses of which 338 is typical. The distance "y" from the apices of the individual microlenses 338 is the aplanatic point, approximately 0.7 of the microlens diameter. The active segment of each microlens 338 need only be somewhat larger than the critical angle, $I_c$, as shown. As a result, the lenticulated surface relief is smaller (i.e., a more robust surface) and there is less "dead space" between microlenses. As the index of refraction of the lenticulars is increased, the critical angle decreases and the lenticulars become even more shallow.

Phase-controlled illumination is provided as before, as indicated by 342, and the encoded information residing in layer 334 is imaged by a suitable objective (e.g., a microscope objective that feeds its image to a CCD camera as before followed by suitable downstream signal processing). The microscope objective 340 can be moved over the surface of media 330 or, alternatively, media 330 can be moved relative to microscope objective 340. Movement, as before, can be via either rotation or rectilinear translation.

Figure 23:
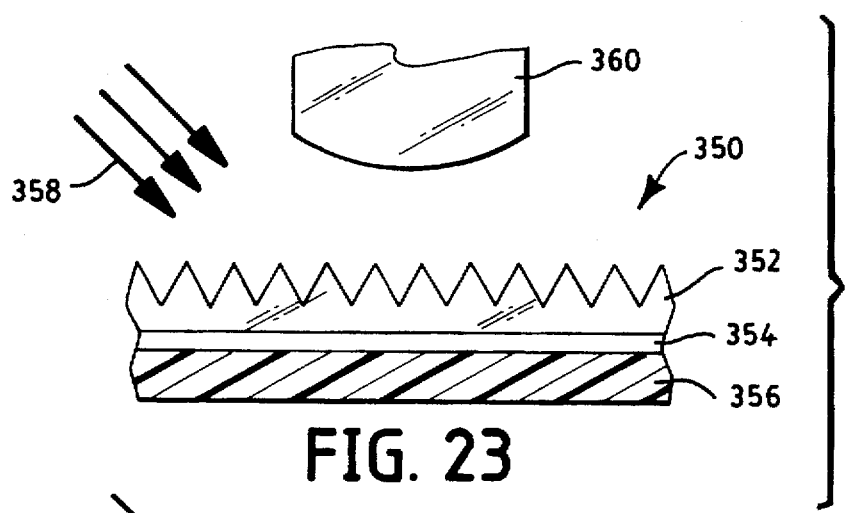
FIG. 23 is a diagrammatic elevational view, partially in section, of a media in which a diffractive grating structure has been formed to generate an evanescent field.

FIG. 23 shows another media structure having a distributed optical means for creating the evanescent field. Here, media 350 comprises a diffractive structure 352 overlying a read/write layer 354 both of which sit atop a support substrate 356. The diffractive grating structure 352 has a spatial grating period smaller than the wavelength of the beam of phase controlled illumination 358 such that the diffracted orders are evanescent where the local phase of the evanescent field is determined by and phase locked to the diffractive structure 352. Again, the information residing in the layer 354 is imaged by a microscope objective 360.

Figure 24:
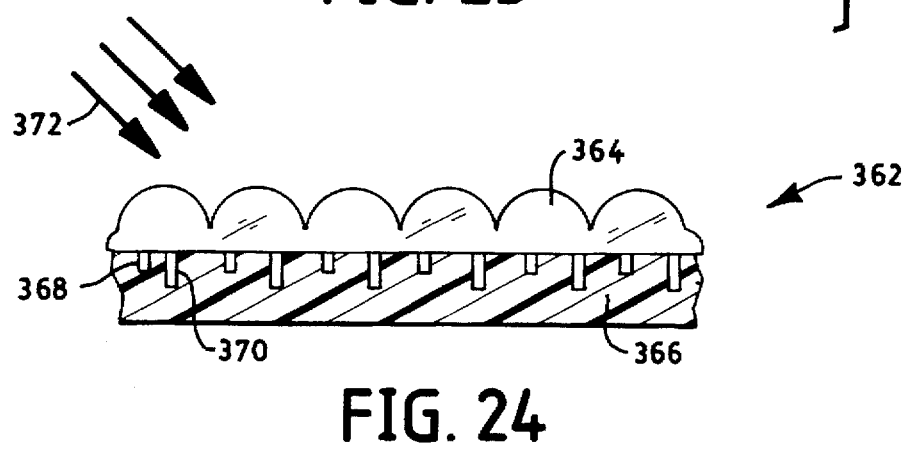
FIG. 24 is a diagrammatic elevational view, partially in section, of a media in which a lenticulated microlens structure is laminated to a substrate in which information has been encoded as pits of varying depth.

FIG. 24 shows yet another possible media structure comprising distributed optical means for forming the required phase controlled evanescent field. Here, media 362 is a laminated structure in which a lenticulated microlens system 364 is laminated over an information layer 366 which has pits 368 and 370 of different depth formed in its surface as a means for encoding different information. As will be appreciated, pits 368 and 370 can be different tracks that can be accessed via a single corresponding lenticule to provide different optical signals simultaneously for parallel processing. Indeed, with this media, as with the others, the encoded information is imaged by a microscope objective which is capable of imaging over several lenticules at a time. Because the information is imaged full field as opposed to a single track at a time, it is possible to "scan" over many lenticules simply by addressing the corresponding pixels in a CCD.

It will also be understood that any or all of the features described in connection with reference to system 10 can be incorporated into the system of FIG. 20 or used in connection with the media of FIGS. 22–24.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A phase controlled evanescent field optical storage and retrieval system for use with a light transmissive media of the type having at least one interface surface having formed therein at predetermined locations with respect to said interface surface a plurality of local optically active sites by which information has been encoded in said light transmissive media, said system comprising:

lighting means for providing at least one beam of radiation having at least one predetermined wavelength and phase angle;

optical means for receiving said beam of radiation from said lighting means and illuminating a proximity surface with a wavelength evanescent field having planes of equal intensity parallel to said proximity surface and planes of equal phase substantially perpendicular to said proximity surface such that light initially bound within said wavelength evanescent field is converted into propagating light when said proximity surface is brought proximate to said interface surface of said media and such that, in the absence of said interface surface near said proximity surface, or if said interface surface is distant from said proximity surface, no evanescent light energy is converted into propagating light, the phase and intensity of said propagating light varying in correspondence with the presence or absence of said optically active sites of said media and their local proximity to said evanescent field;

phase control means for selectively controlling said predetermined wavelength and phase angle of said beam of radiation such that the intensity of said evanescent light varies as a function of the phase of said beam of radiation and the lateral position of said optically active sites of said media;

imaging means having at least one optical axis positioned to collect said propagating light and form an image of said optically active sites in which at least one of said optically scattering sites is present as an imagewise variation of image intensity; and photodetector means for generating image signals having an amplitude that varies in accordance with the presence or absence of an optically active site.

2. The system of claim 1 wherein said phase control means is dynamic in operation.

3. The system of claim 1 wherein said phase control means is static in operation.

4. The system of claim 1 wherein said phase control means comprises filtering means for selectively controlling the output of said lighting means to preselected wavelengths of radiation.

5. The system of claim 4 wherein said filtering means is structured to pass at least two different wavelengths.

6. The system of claim 1 wherein said phase control means comprises polarization means.

7. The system of claim 1 wherein said phase control means comprises an electro-optic modulator.

8. The system of claim 1 wherein said phase control means comprises a tunable optical cavity.

9. The system of claim 1 wherein said phase control means comprises means for changing the angle of incidence of said beam of radiation from said lighting means.

10. The system of claim 1 wherein said phase control means comprises a retarding phase plate.

11. The system of claim 10 wherein said retarding phase plate comprises annular phase masks with different numerical apertures greater than one.

12. The system of claim 1 wherein said phase control means comprises a split polarizer.

13. The system of claim 1 wherein said phase control means comprises a split color filter.

14. The system of claim 1 wherein said optical means comprises a diffractive grating structure having a spatial grating period smaller than the wavelength of said beam of radiation from said lighting means such that the diffracted orders are evanescent where the local phase of the evanescent field is determined by and phase-locked to said diffractive grating structure.

15. The system of claim 14 further including means for varying said spatial grating period of said diffractive grating structure to shift the phase of the evanescent field.

16. The system of claim 15 wherein said means for varying said spatial grating period comprises a tunable acoustic wave modulator.

17. The system of claim 15 wherein said means for varying said spatial grating period comprises a piezo crystal modulator.

18. The system of claim 1 wherein said optical means comprises a light transmissive body having an entrance facet for receiving said beam of radiation from said lighting means from which said evanescent field is formed, a distal facet at which said evanescent field is formed so that said interface surface can be brought proximate to it, and at least one exit facet from which propagating light emerges.

19. The system of claim 18 where said light transmissive body, said entrance facet and said exit facet thereof are structured and arranged with respect to one another so that said distal facet is a totally internally reflecting barrier where said evanescent field is caused by photons tunneling beyond said distal facet.

20. The system of claim 1 wherein said propagating radiation is specularly reflected.

21. The system of claim 1 wherein said propagating radiation is scattered.

22. The system of claim 1 further including means for receiving said image signal and generating a tone mapping signal in which said scattering sites are encoded as imagewise variations in tone.

23. The system of claim 1 wherein said imaging means comprises a microscope.

24. The system of claim 1 further including a light transmissive media of having at least one interface surface having formed therein at predetermined locations with respect to said interface surface a plurality of local optically active sites by which information has been encoded in said light transmissive media.

25. The system of claim 24 wherein said light transmissive recording media is mounted for rotation.

26. The system of claim 24 in which said light transmissive media is a circular disk.

27. The system of claim 24 wherein said optically active sites are on the surface of said light transmissive media.

28. The system of claim 24 wherein said optically active sites are internal to the volume of said light transmissive media so that information is encoded three-dimensionally.

29. The system of claim 28 wherein said optically active sites are different distances from the surface of said light transmissive media to enhance the number of degrees of encoding.

30. The system of claim 24 wherein said light transmissive media comprises a plurality of layers of different index of refraction and wherein said optically active sites reside within said layers.

31. The system of claim 30 wherein the information encoded in said layers is selected by varying the illumination wavelength, incident angle, polarization, or phase.

32. The system of claim 24 wherein said scattering sites are phase changes in a dielectric or semiconductor.

33. The system of claim 24 wherein said scattering sites are in semiconductor-doped, chalcogenide glasses, or photopolymer materials.

34. A phase controlled evanescent field optical storage and retrieval system, said system comprising steps of:

mounting a light transmissive media having at least one interface surface having formed therein at predetermined locations with respect to said interface surface a plurality of local optically active sites by which information has been encoded in said light transmissive media lighting said interface surface with at least one light beam having a predetermined wavelength and phase angle;

receiving said beam of radiation from said lighting means and illuminating a proximity surface with a wavelength evanescent field having planes of equal intensity parallel to said proximity surface and planes of equal phase substantially perpendicular to said proximity surface such that light initially bound within said wavelength evanescent field is converted into propagating light when said proximity surface is brought proximate to said interface surface of said media and such that, in the absence of said interface surface near said proximity surface, or if said interface surface is distant from said proximity surface, no evanescent light energy is converted into propagating light, the phase and intensity of said propagating light varying in correspondence with the presence or absence of said optically active sites of said media and their local proximity to said evanescent field;

selectively controlling said predetermined wavelength and phase angle of said beam of radiation such that the intensity of said evanescent light varies as a function of the phase of said beam of radiation and the lateral position of said optically active sites of said media;

collecting said propagating light and forming an image of said optically active sites in which at least one of said optically scattering sites is present as an imagewise variation of image intensity; and generating image signals having an amplitude that varies in accordance with the presence or absence of an optically active site.

35. The method of claim 34 further including the step of receiving said image signal and generating a tone mapping signal in which the presence or absence of a scattering site is encoded as an imagewise variation in tone.

36. The method of claim 34 wherein said step of selectively controlling the wavelength and phase of said beam of radiation is dynamic in operation.

37. The method of claim 34 wherein said step of selectively controlling the wavelength and phase of said beam of radiation is static in operation.

38. The method of claim 34 wherein said step of controlling the wavelength and phase of said beam of radiation comprises filtering said beam of radiation to restrict its output to preselected wavelengths of radiation.

39. The method of claim 34 wherein said step of controlling the wavelength and phase of said beam of radiation comprises polarizing said beam of radiation.

40. The method of claim 34 wherein said step of controlling the wavelength and phase of said beam of radiation comprises changing the angle of incidence of said beam of radiation from said lighting means.

41. The method of claim 34 wherein said step of controlling the wavelength and phase of said beam of radiation comprises retarding said beam of radiation.

42. The method of claim 34 wherein said step of controlling the wavelength and phase of said beam of radiation comprises selecting the azimuthal angle of the incident illumination, and thus the direction of the Goos-Haenchen shift.

43. The method of claim 34 wherein said step of receiving said beam of illumination and illuminating a proximity surface comprises illuminating a diffractive grating structure having a spatial grating period smaller than the wavelength of said beam of radiation from said lighting means such that the diffracted orders are evanescent where the local phase of the evanescent field is determined by and phase-locked to said diffractive grating structure.

44. The method of claim 43 further including the step of varying said spatial grating period of said diffractive grating structure to shift the phase of the evanescent field.

45. An optical storage and retrieval media, said media comprising:

an optically active layer having a given index of refraction, said optically active layer being adapted and arranged to locally change its optical properties so that information can be encoded in it in the form of local optically active microscopic sites;

a distributed micro-optical structure overlying said optically active layer to form an interface therewith and having an index of refraction higher than that of said optically active layer, said distributed micro-optical structure being adapted to receive illumination from an external source and illuminate said interface with a wavelength evanescent field having planes of equal intensity parallel to said interface and planes of equal phase substantially perpendicular to said interface such that light initially bound within said wavelength evanescent field is converted into propagating light when optically active microscopic sites are present in said optically active layer and such that, in the absence of said optically active microscopic sites, no evanescent light energy is converted into propagating light, the phase and intensity of said propagating light varying in correspondence with the presence or absence of said optically active microscopic sites of said media and their local proximity to said evanescent field.

46. The media of claim 45 wherein said distributed micro-optical structure comprises a plurality of periodic micro-lenses.

47. The media of claim 46 wherein each of said microlenses is an aplanatic lens whose aplanatic surface is proximate said interface.

48. The media of claim 46 wherein said distributed micro-optical structure comprises a diffractive grating structure.

49. The media of claim 45 wherein optically active microscopic sites are in the form of pits of different depth.

50. The media of claim 45 wherein said optically active microscopic sites are in the form of phase changes.

51. The media of claim 45 wherein said optically active layer is selected form the group of materials consisting of semiconductor-doped materials, chalcogenide glasses, and photopolymer materials.

* * * * *